(12) United States Patent
Hsu (10) Patent No.: US 10,635,206 B2
(45) Date of Patent: Apr. 28, 2020

(54) TOUCH PANEL AND MANUFACTURING METHOD THEREOF (71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chien-Chih Hsu, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

(*) Notice: Subject to any disclaimer, the term of this patent is extended or adjusted under 35 U.S.C. 154(b) by 43 days.

(21) Appl. No.: 15/975,793

(22) Filed: May 10, 2018

(65) Prior Publication Data

US 2019/0302913 A1 Oct. 3, 2019

(30) Foreign Application Priority Data

Apr. 2, 2018 (CN) .......................... 2018 1 0283504

(51) Int. Cl.
G06F 3/041 (2006.01)
(52) U.S. Cl.
CPC .... *G06F 3/041* (2013.01); *G06F 2203/04103* (2013.01); *G06F 2203/04107* (2013.01)

(58) Field of Classification Search
CPC .......... G06F 3/041; G06F 2203/04103; G06F 2202/28; G06F 2203/04107; G06F 1/16; G02F 2202/28
See application file for complete search history.

(56) References Cited

U.S. PATENT DOCUMENTS

| 2013/0027799 A1* | 1/2013 | Hsu | B82Y 20/00 359/885 |
| 2016/0170541 A1* | 6/2016 | Iwami | G06F 3/044 345/174 |
| 2017/0010638 A1* | 1/2017 | Park | G09G 3/2092 |

* cited by examiner

*Primary Examiner* — Robert J Michaud
(74) *Attorney, Agent, or Firm* — CKC & Partners Co., LLC (57) ABSTRACT A touch panel is provided. The touch panel includes a substrate, a ground layer, a passivation layer, a conductive layer and a shielding layer. The ground layer is disposed on and covers a portion of a surface of the substrate. The passivation layer is disposed on the ground layer, thereby the ground layer has a covered portion and an exposed portion. The covered portion is covered by the passivation layer. The conductive layer is disposed on and completely covers the exposed portion of the ground layer. A portion of the passivation layer is covered by the conductive layer. The shielding layer is disposed on the conductive layer, and the orthogonal projections of the shielding layer and the ground layer onto the surface of the substrate are at least partially overlapped with each other. The present invention also provides a manufacturing method of a touch panel.

8 Claims, 6 Drawing Sheets

10

```
providing a laminate having a substrate, a first
ground layer and a first passivation layer, the
substrate has a first surface, in which a portion of
the first surface is covered by the first ground
layer, whereas the first ground layer has a covered
and an exposed portion, in which the covered
portion is covered by the first passivation layer
```
— S11

↓

```
forming a first conductive layer on the exposed
portion of the first ground layer and a portion of
the first passivation layer, in which the exposed
portion of the first ground layer is completely
covered by the first conductive layer
```
— S12

↓

```
forming a first shielding layer on the first
conductive layer, in which the orthogonal
projection of the first shielding layer and the first
ground layer onto the first surface are partially
overlapped to each other
```
— S13

| providing a laminate having a substrate, a first ground layer, a first passivation layer, a second ground layer and a second passivation layer, the substrate has a first surface and a second surface, in which a portion of the first surface is covered by the first ground layer, whilst a portion of the second surface is covered by the second ground layer, whereas each of the first ground layer and the second ground layer has a covered and an exposed portion, in which the covered portion of the first ground layer is covered by the first passivation layer, whilst the covered portion of the second ground layer is covered by the second passivation layer | 510 |

↓

| forming a first conductive layer on the exposed portion of the first ground layer and a portion of the first passivation layer, in which the exposed portion of the first ground layer is completely covered by the first conductive layer | 520 |

↓

| forming a first shielding layer on the first conductive layer, in which the orthogonal projection of the first shielding layer and the first ground layer onto the first surface are partially overlapped to each other | 530 |

↓

| forming a second conductive layer on the exposed portion of the second ground layer and a portion of the second passivation layer, in which the exposed portion of the second ground layer is completely covered by the second conductive layer | 540 |

↓

| forming a second shielding layer on the second conductive layer, in which the orthogonal projection of the second shielding layer and the second ground layer onto the second surface are partially overlapped to each other | 550 |

TOUCH PANEL AND MANUFACTURING METHOD THEREOF

CROSS-REFERENCE TO RELATED APPLICATION

This application claims priority to Chinese Application Serial Number 201810283504.7, filed Apr. 2, 2018, which is herein incorporated by reference.

BACKGROUND

Field of Invention

The present invention relates to a touch panel and manufacturing method thereof.

Description of Related Art

The components in a touch panel are generally adhered to each other via a laminating process. However, if any of these components has an exposed metal portion after the laminating process, then the exposed metal portion will be susceptible to the influence of external environment, such as the erosion of moisture, resulting in corrosion or deterioration of the exposed metal portion and therefore the malfunction of the touch panel.

SUMMARY

One aspect of the present invention is to provide a touch panel. The ground layer in the touch panel is not exposed, and therefore the ground layer is fully protected from the influence of external environment, such as erosion of moisture while no additional adhesive is needed, thereby preventing corrosion of the ground layer and malfunction of the touch panel.

The touch panel includes a substrate, a first ground layer, a first passivation layer, and a first conductive layer. The substrate has a first surface. The first ground layer is disposed on the first surface of the substrate and covering a portion of the first surface. The first passivation layer is disposed on the first ground layer and thereby the first ground layer has a covered portion and an exposed portion, in which the covered portion is covered by the first passivation layer. The first conductive layer is disposed on and covering the exposed portion of the first ground layer and a portion of the first passivation layer, in which the exposed portion of the first ground layer is completely covered by the first conductive layer. A portion of the first surface of the substrate is covered by the first conductive layer.

In one embodiment, the touch panel further includes a first shielding layer disposed on the first conductive layer.

In one embodiment, the touch panel further includes a second ground layer. The second ground layer is disposed on the second surface of the substrate and covering a portion of the second surface. The second surface is opposite to the first surface of the substrate.

In one embodiment, the touch panel further includes a second passivation layer. The second passivation layer is disposed on the second ground layer and thereby the second ground layer has a covered portion and an exposed portion. The covered portion is covered by the second passivation layer.

In one embodiment, the touch panel further includes a second conductive layer. The second conductive layer is disposed on and covering the exposed portion of the second ground layer and a portion of the second passivation layer, in which the exposed portion of the second ground layer is completely covered by the second conductive layer.

In one embodiment, the touch panel further includes a second shielding layer. The second shielding layer is disposed on the second conductive layer. The orthogonal projection of the second shielding and the second ground layer onto the second surface are at least partially overlapped with each other.

In one embodiment, the first conductive layer is a conductive adhesive layer.

In one embodiment, the conductive adhesive layer includes a matrix part and a conductive part. The matrix part includes an acrylic resin or an epoxy resin, while the conductive part is dispersed in the matrix part.

Another aspect of the present invention is to provide a method of manufacturing touch panel. The method includes: providing a laminate having a substrate, a first ground layer, and a first passivation layer. The first ground layer and the first passivation layer are sequentially disposed on the substrate. A portion of a first surface of the substrate is covered by the first ground layer having a covered portion and an exposed portion, and the covered portion is covered by the first passivation layer; forming a first conductive layer covering on the exposed portion of the first ground layer and a portion of the first passivation layer, in which the exposed portion of the first ground layer is completely covered by the first conductive layer.

In one embodiment, the method further includes forming a first shielding layer on the first conductive layer.

In one embodiment, the laminate further includes a second ground layer and a second passivation layer. The substrate further includes a second surface opposite to the first surface of the substrate. The second ground layer and the second passivation layer are sequentially disposed on the second surface. A portion of the second surface is covered by the second ground layer having a covered portion and an exposed portion. The covered portion is covered by the second passivation layer.

In one embodiment, after disposing the first shielding layer on the first conductive layer, the method further includes: disposing a second conductive layer covering on the exposed portion of the second ground layer and a portion of the second passivation layer, in which the exposed portion of the second ground layer is completely covered by the second conductive layer; disposing a second shielding layer on the second conductive layer, in which the orthogonal projection of the second shielding layer and the second ground layer onto the second surface are at least partially overlapped with each other.

In the method of manufacturing touch panel provided in the present invention, the ground layer of the resulting touch panel is not exposed. The ground layer is fully protected from the influence of external environment such as erosion of moisture without using additional adhesive, thereby preventing corrosion of the ground layer and malfunction of the touch panel.

BRIEF DESCRIPTION OF THE DRAWINGS

The invention can be more fully understood by reading the following detailed description of the embodiment, with reference made to the accompanying drawings as follows:

FIG. 5 is a flowchart of a manufacturing method of a touch panel according to some other embodiments of the present invention.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

In the present disclosure, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
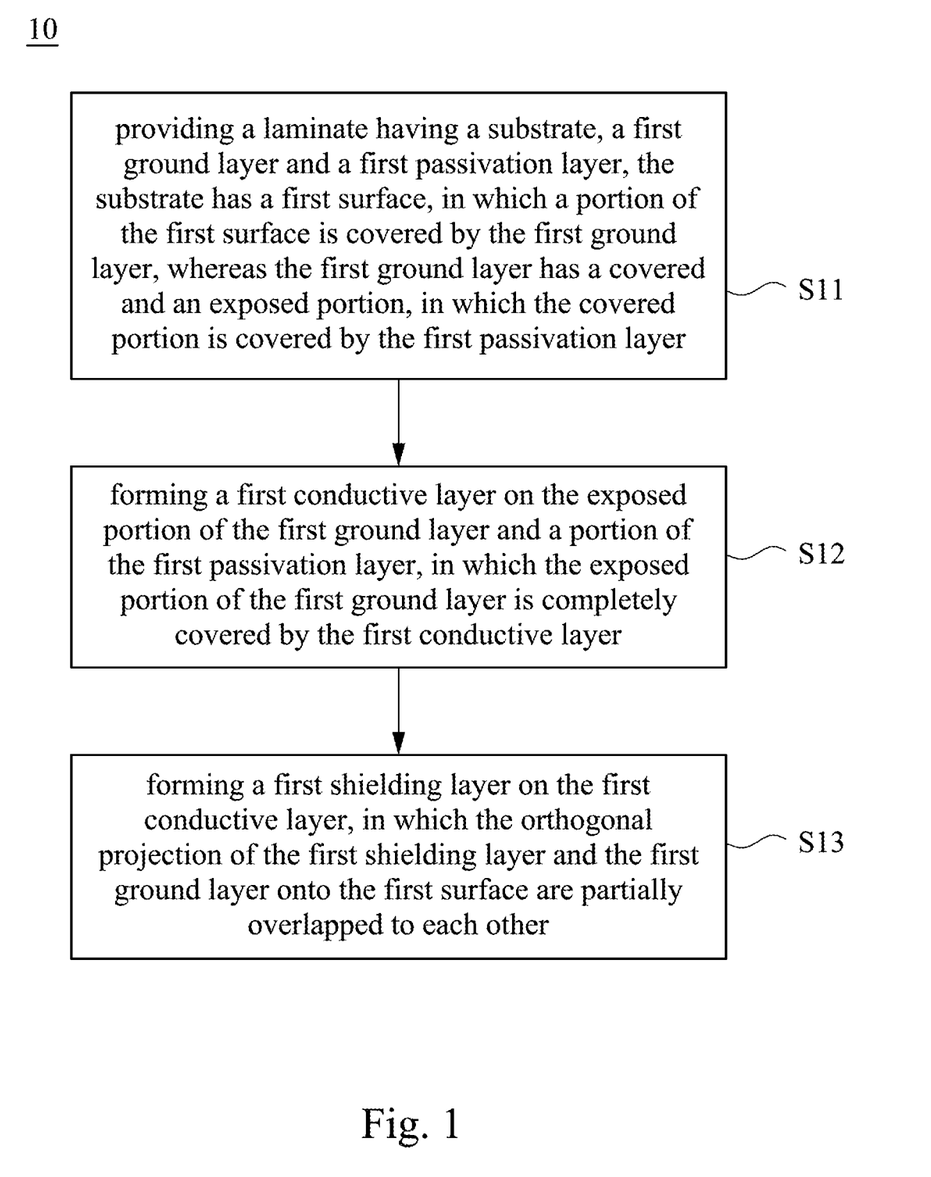
FIG. 1 is a flowchart of a manufacturing method of a touch panel according to some embodiments of the present invention.
Figure 2:
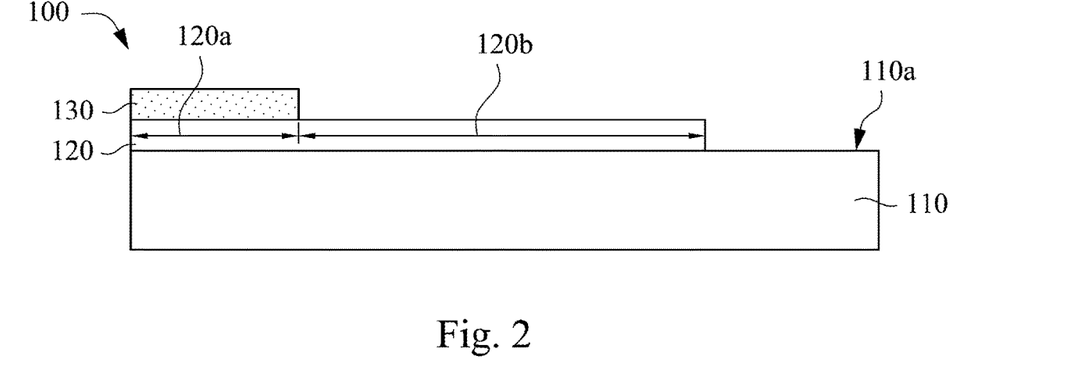
FIG. 2 to FIG. 4 illustrates sectional views of the touch panel during various manufacturing stages according to some embodiments of the present invention.
Figure 3:
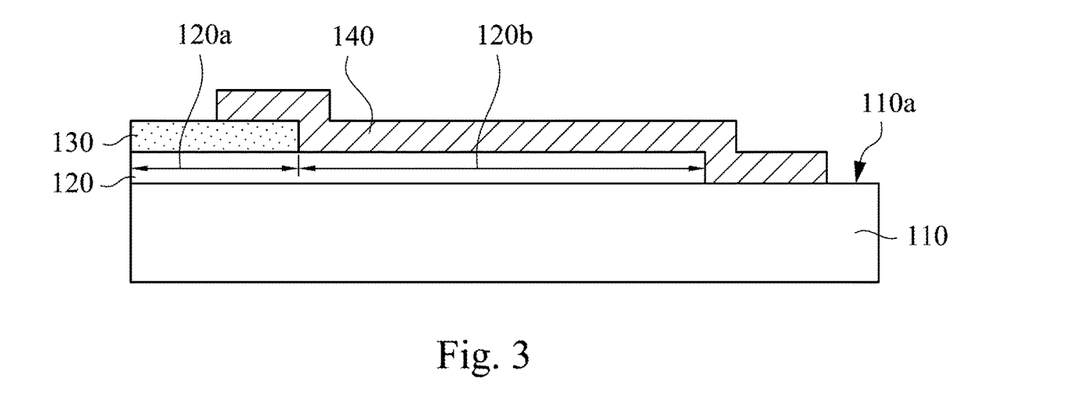
Figure 4:
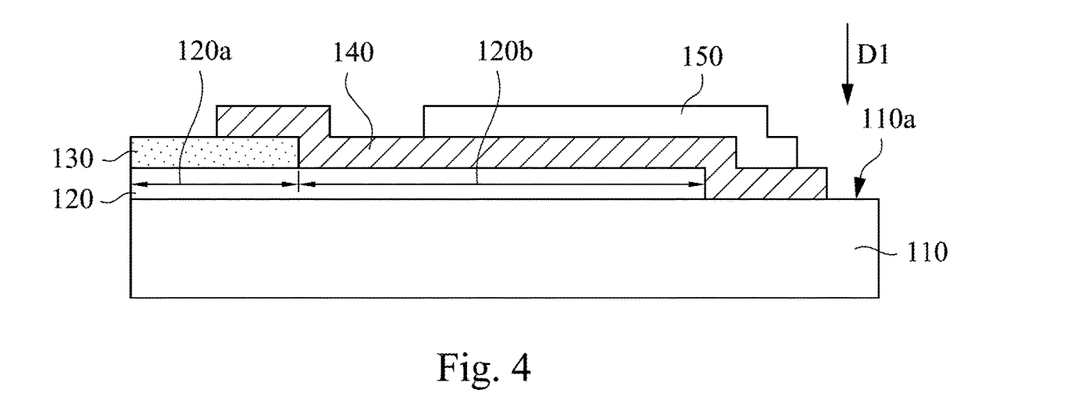

FIG. 1 is a flowchart of a method 10 of manufacturing a touch panel according to one embodiment of the present invention. FIG. 2 to FIG. 4 illustrates sectional views of the touch panel during various manufacturing stages according to some embodiments of the present invention. As shown in FIG. 1, the method 10 includes step S11, step S12, and step S13. It is understood that additional steps may be provided before, during or after method 10, and some of following steps may be substituted or eliminated as additional embodiments of the manufacturing method.

Referring to FIG. 1 and FIG. 2. At step S11, a laminate 100 is provided (as shown in FIG. 2). According to one embodiment of the present invention, the laminate 100 includes a substrate 110, a first ground layer 120 and a first passivation layer 130. The substrate 110 has a first surface 110a, while the first ground layer 120 and the first passivation layer 130 are sequentially disposed on the first surface 110a. A portion of the first surface 110a is covered by the first ground layer 120. The first ground layer 120 has a covered portion 120a that is covered by the first passivation layer 130 and an exposed portion 120b that is not covered by the first passivation layer 130.

In one embodiment, the substrate 110 is made of polyethylene terephthalate (PET), polyvinyl chloride (PVC), polypropylene (PP), poly(ethylene naphthalate) (PEN), polycarbonate (PC), polystyrene (PS), or similar material thereof.

In one embodiment, the first ground layer 120 is made of copper-nickel alloy or similar material thereof.

In one embodiment, the first passivation layer 130 is made of polyimide (PI) or similar material thereof.

Referring to FIG. 1 and FIG. 3. At step S12, a first conductive layer 140 is disposed on and covers the exposed portion 120b of the first ground layer 120 and a portion of the first passivation layer 130. Specifically, the exposed portion 120b of the first ground layer 120 may be completely covered or partially covered by the first conductive layer 140. A portion of the first surface 110a of the substrate 110 is also covered by the first conductive layer 140.

In one embodiment, in the step of disposing the first conductive layer 140 on the exposed portion 120b of the first ground layer 120, the material for forming the first conductive layer 140 may be trimmed to form the first conductive layer 140 having an appropriate length, and the position for disposing the first conductive layer 140 is determined by capturing and observing the image of the exposed portion 120b of the first ground layer 120. In one example, in order to keep the exposed portion 120b of the first ground layer 120 well covered by the first conductive layer 140, the length of the first conductive layer 140 must be at least greater than the length of the exposed portion 120b of the first ground layer 120 to protect the exposed portion 120b of the first ground layer 120 from the influence of external environment, such as erosion of moisture, thereby preventing corrosion or deterioration of the first ground layer 120. The first conductive layer 140 must be disposed on at least a portion of the first passivation layer 130 to avoid being influenced by the external environment.

In one embodiment, the first conductive layer 140 is a conductive adhesive layer. In one embodiment, the conductive adhesive layer includes a matrix part and a conductive part. The matrix part includes waterproof material. In one example, the waterproof material is a waterproof acrylic resin or an epoxy resin which can be cured by ultraviolet light treatment. The conductive part is dispersed in the matrix part. In one example, the conductive part is a metal such as silver. In one example, the conductive part is a conductive metal sphere coated with an insulating material.

In one embodiment, the first conductive layer 140 is an isotropic conductive adhesive layer. The isotropic conductive adhesive layer can generate vertical electrical conduction and lateral electrical conduction between the upper and lower metal layers when subjected to a relatively small pressing force and meanwhile preventing the structure of the final product from damages caused by a larger pressing force. The isotropic conductive adhesive layer can also reduce the manufacturing cost. In another embodiment, the first conductive layer 140 is an anisotropic conductive adhesive. The anisotropic conductive adhesive can generate vertical electrical conduction between the upper and lower metal layers without generating lateral electrical conduction.

At step S13, a first shielding layer 150 is disposed on the first conductive layer 140, as shown in FIG. 4. The orthogonal projection of the first shielding layer 150 and the first ground layer 120 onto the first surface 110a are at least partially overlapped with each other. In other words, the first shielding layer 150 is at least partially overlapped with the first ground layer 120 in a direction D1 perpendicular to the first surface 110a.

In one embodiment shown in FIG. 4, only a portion of the first conductive layer 140 is covered by the first shielding layer 150, but it is not limited thereto. In another embodiment, the first conductive layer 140 may be completely covered by the first shielding layer 150. In one embodiment, only a portion of the first conductive layer 140 that is located on the previously exposed portion 120b of the first ground layer 120 is covered by the first shielding layer 150, but a portion of the first conductive layer 140 located on the first passivation layer 130 is not covered by the first shielding layer 150.

In one embodiment, the first shielding layer 150 is made of metal, such as aluminum, aluminum alloy or similar material. In one embodiment, the first shielding layer 150 can reduce the interference signal from the external environment.

In one embodiment, after disposing the first shielding layer 150 on the first conductive layer 140, the method further includes pressurizing the structure shown in FIG. 4 to remove air bubbles which may be generated during lamination.

In the touch panel shown in FIG. 4, the first conductive layer 140 is directly disposed on and covers the exposed portion 120b of the first ground layer 120 and a portion of the first passivation layer 130. Therefore in the embodiment of the present invention, the exposed portion 120b of the first ground layer 120 can be protected from the influence of the external environment such as erosion of moisture without using additional adhesive, thereby preventing malfunction of the final product. Moreover, because no additional adhesive is required in the embodiments of the present invention, the manufacturing process of the touch panel may be shortened and the manufacturing cost of the touch panel may be reduced.

FIG. 5 is a flowchart of method 20 of manufacturing a touch panel according to one embodiment of the present invention. As shown in FIG. 5, the method 20 includes step S21, step S22, step S23, step S24, and step S25. It is understood that additional steps may be provided before, during or after method 20, and some of the following steps may be substituted or eliminated as additional embodiments of the manufacturing method. FIG. 6 to FIG. 10 illustrates sectional views of the touch panel during various manufacturing stages according to some other embodiments of the present invention.

Figure 6:
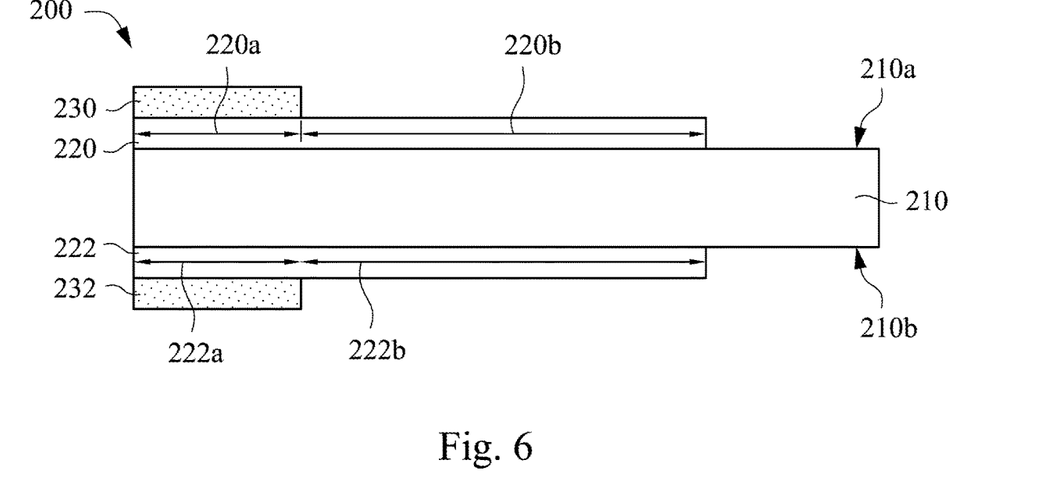
FIG. 6 to FIG. 10 illustrates sectional views of the touch panel during various manufacturing stages according to some other embodiments of the present invention.

Referring to FIG. 5 and FIG. 6. At step S21, a laminate 200 is provided as shown in FIG. 6. According to one embodiment of the present invention, the laminate 200 includes a substrate 210, a first ground layer 220, and a first passivation layer 230. The substrate 210 has a first surface 210a and a second surface 210b opposite to the first surface 210a. The first ground layer 220 and the first passivation layer 230 are sequentially disposed on the first surface 210a. A portion of the first surface 210a is covered the first ground layer 220 having a covered portion 220a and an exposed portion 220b. The covered portion 220a is covered by the first passivation layer 230. The laminate 200 further includes a second ground layer 222 and a second passivation layer 232 sequentially disposed on the second surface 210b. A portion of the second surface 210b is covered by the second ground layer 222 having a covered portion 222a and an exposed portion 222b. The covered portion 222a is covered by the second passivation layer 232. Specifically, the first ground layer 220 and the second ground layer 222 are for receiving ground signals.

In one embodiment, the substrate 210 is made of polyethylene terephthalate (PET), polyvinyl chloride (PVC), polypropylene (PP), poly(ethylene naphthalate) (PEN), polycarbonate (PC), polystyrene (PS), or similar material thereof.

In one embodiment, the first ground layer 220 and the second ground layer 222 are made of copper-nickel alloy or similar material thereof.

In one embodiment, the first passivation layer 230 and the second passivation layer 232 are made of polyimide (PI) or similar material thereof.

Figure 7:
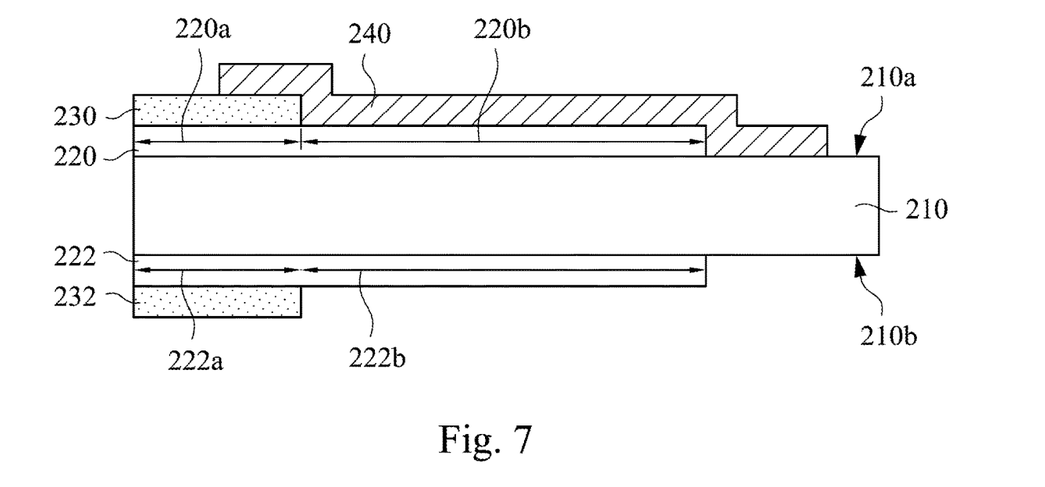

Referring to FIG. 5 and FIG. 7. At step S22, a first conductive layer 240 is disposed on the first ground layer 220 and covers the exposed portion 220b of the first ground layer 220, as shown in FIG. 7. Specifically, the exposed portion 220b of the first ground layer 220 may be completely covered or partially covered by the first conductive layer 240. A portion of the first passivation layer 230 and a portion of the first surface 210a of the substrate 210 may be covered by the first conductive layer 240.

In one embodiment, in the step of disposing the first conductive layer 240 on the exposed portion 220b of the first ground layer 220, the material for forming the first conductive layer 240 may be trimmed to form the first conductive layer 240 having an appropriate length, and the position for disposing the first conductive layer 240 is determined by capturing and observing the image of the exposed portion 220b of the first ground layer 220.

In order to keep the exposed portion 220b of the first ground layer 220 well covered by the first conductive layer 240, the length of the first conductive layer 240 must be at least greater than the length of the exposed portion 220b of the first ground layer 220 to protect the exposed portion 220b of the first ground layer 220 from the influence of external environment, such as erosion of moisture, thereby preventing corrosion or deterioration of the first ground layer 220. The first conductive layer 240 must be disposed on at least a portion of the first passivation layer 230 to avoid being influenced by the external environment.

In one embodiment, the first conductive layer 240 is a conductive adhesive layer. In one embodiment, the conductive adhesive layer includes a matrix part and a conductive part. The matrix part includes waterproof material. In one example, the waterproof material is a waterproof acrylic resin or an epoxy resin which can be cured by ultraviolet light treatment. The conductive part is dispersed in the matrix part. In one example, the conductive part is a metal, such as silver. In one example, the conductive part is a conductive metal sphere coated with an insulating material.

In one embodiment, the first conductive layer 240 is an isotropic conductive adhesive layer. The isotropic conductive adhesive layer can generate vertical electrical conduction and lateral electrical conduction between the upper and lower metal layers when subjected to a relatively small pressing force and meanwhile preventing the structure of the final product from damages caused by a larger pressing force. The isotropic conductive adhesive layer can also reduce the manufacturing cost. In another embodiment, the first conductive layer 240 is an anisotropic conductive adhesive. The anisotropic conductive adhesive can generate vertical electrical conduction between the upper and lower metal layers without generating lateral electrical conduction.

Figure 8:
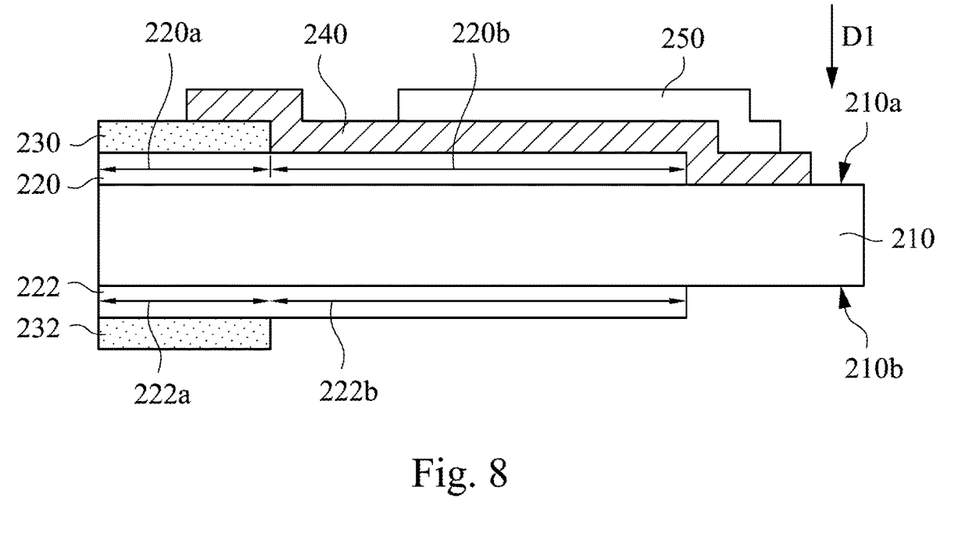

At step S23, a first shielding layer 250 is disposed on the first conductive layer 240, as shown in FIG. 8. The orthogonal projection of the first shielding layer 250 and first ground layer 220 onto the first surface 210a are at least partially overlapped with each other. In other words, the first shielding layer 250 is at least partially overlapped with the first ground layer 220 in a direction D1 perpendicular to the first surface 210a.

In one embodiment shown in FIG. 8, only a portion of the first conductive layer 240 is covered by the first shielding layer 250, but it is not limited thereto. In another embodiment, the first conductive layer 240 may be completely covered by the first shielding layer 250. In some other embodiments, only a portion of the first conductive layer 240 that is located on the previously exposed portion 220b of the first ground layer 220 is covered by the first shielding layer 250, but a portion of the first conductive layer 240 located on the first passivation layer 230 is not covered by the first shielding layer 250.

In one embodiment, the first shielding layer 250 is made of metal, such as aluminum, aluminum alloy or similar material. In one embodiment, the first shielding layer 250 can reduce the interference signal from the external environment.

Figure 9:
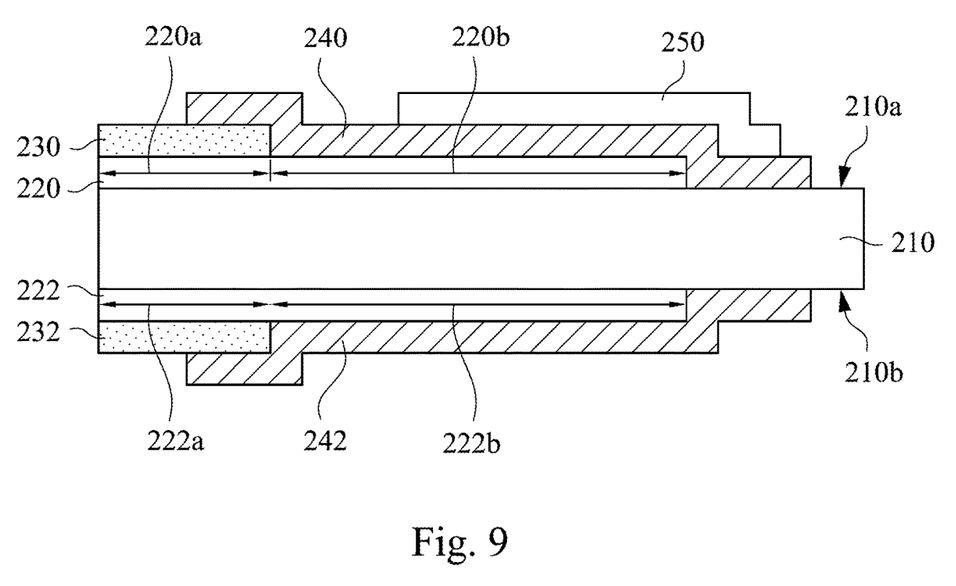

At step S24, the second conductive layer 242 is disposed on and covering the exposed portion 222b of the second ground layer 222 and a portion of the second passivation layer 232, as shown in FIG. 9. Specifically, the exposed portion 222b of the second ground layer 222 may be completely covered or partially covered by the second conductive layer 242. A portion of the second surface 210b of the substrate 210 is also covered by the second conductive layer 242.

In one embodiment, in the step of disposing the second conductive layer 242 on the exposed portion 222b of the second ground layer 222, the material for forming the second conductive layer 242 may be trimmed to form the second conductive layer 242 having an appropriate length, and the position for disposing the second conductive layer 242 is determined by capturing and observing the image of the exposed portion 222b of the second ground layer 222.

In order to keep the exposed portion 222b of the second ground layer 222 well covered by the second conductive layer 242, the length of the second conductive layer 242 must be at least greater than the length of the exposed portion 222b of the second ground layer 222 to protect the exposed portion 222b of the second ground layer 222 from the influence of external environment, such as erosion of moisture, thereby preventing corrosion or deterioration of the second ground layer 222. The second conductive layer 242 must be disposed on at least a portion of the second passivation layer 232 to avoid being influenced by the external environment.

In one embodiment, the second conductive layer 242 is made the same material as the first conductive layer 240. In one embodiment, the second conductive layer 242 is a conductive adhesive layer. In one embodiment, the conductive adhesive layer includes a matrix part and a conductive part. The matrix part includes a waterproof material. In one example, the waterproof material is a waterproof acrylic resin or an epoxy resin which can be cured by ultraviolet light treatment. The conductive part is dispersed in the matrix part. In one example, the conductive part is metal, such as silver. In one example, the conductive part is a conductive metal sphere coated with an insulating material.

In one embodiment, the second conductive layer 242 is an isotropic conductive adhesive layer. Specifically, the isotropic conductive adhesive layer can generate vertical electrical conduction and lateral electrical conduction between the upper and lower metal layers when subjected to a relatively small pressing force and meanwhile preventing the structure of the final product from damages caused by a larger pressing force. The isotropic conductive adhesive layer can also reduce the manufacturing cost. In another embodiment, the second conductive layer 242 is an anisotropic conductive adhesive. Specifically, the anisotropic conductive adhesive can generate vertical electrical conduction between the upper and lower metal layers without generating lateral electrical conduction.

Figure 10:
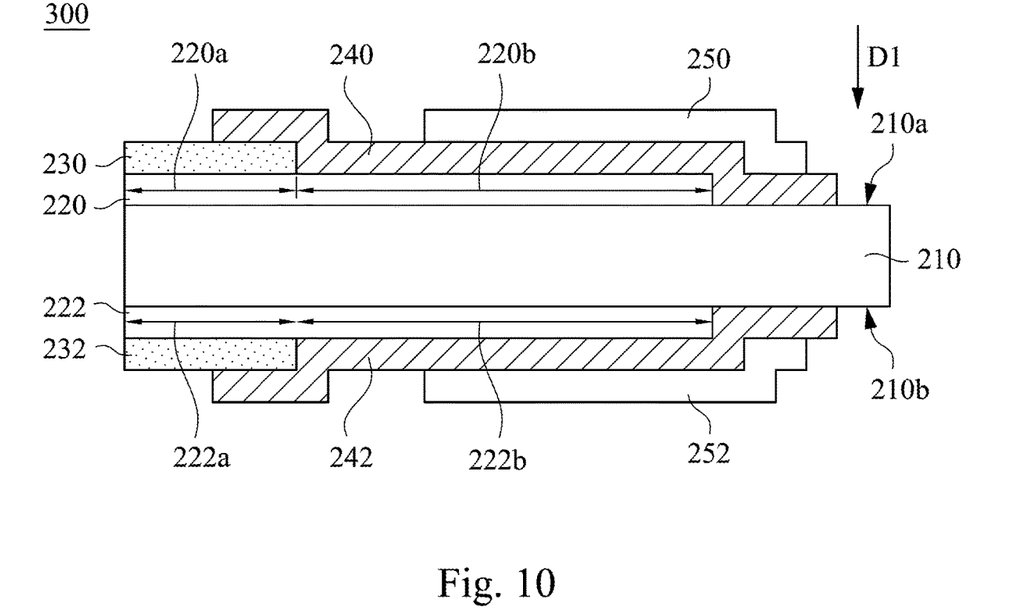

At step S25, a second shielding layer 252 is disposed on the second conductive layer 242, as shown in FIG. 10. The orthogonal projection of the second shielding layer 252 and the second ground layer 222 onto the second surface 210b are at least partially overlapped with each other. In other words, the second shielding layer 252 is at least partially overlapped with the second ground layer 222 in a direction D1 perpendicular to the second surface 210b.

In the embodiment shown in FIG. 10, only a portion of the second conductive layer 242 is covered by the second shielding layer 252, but it is not limited thereto. In another embodiment, the second conductive layer 242 may be completely covered by the second shielding layer 252. In some other embodiments, only a portion of the second conductive layer 242 that is located on the previously exposed portion 222b of the second ground layer 222 is covered by the second shielding layer 252, but a portion of the second conductive layer 242 located on the second passivation layer 232 is not covered by the second shielding layer 252.

In one embodiment, the second shielding layer 252 is made of metal, such as aluminum, aluminum alloy or similar material. In one embodiment, the second shielding layer 252 can reduce the interference signal from the external environment.

In one embodiment, after disposing the second shielding layer 252 on the second conductive layer 242, the method further includes pressurizing the structure shown in FIG. 10 to remove air bubbles which may be generated during lamination.

FIG. 10 illustrates a sectional view of a touch panel 300 according to various embodiments of the present invention. The touch panel 300 includes a substrate 210, a first ground layer 220, a first passivation layer 230, a first conductive layer 240, and a first shielding layer 250. The substrate 210 has a first surface 210a. The first ground layer 220 is disposed on the first surface 210a of the substrate 210 and covering a portion of the first surface 210a. The first passivation layer 230 is disposed on the first ground layer 220, and thereby the first ground layer 220 has a covered portion 220a and an exposed portion 220b. The covered portion 220a is covered by the first passivation layer 230. The first conductive layer 240 is disposed on and covers the exposed portion 220b of the first ground layer 220 and a portion of the first passivation layer 230. Specifically, the exposed portion 220b of the first ground layer 220 may be completely covered or partially covered by the first conductive layer 240. A portion of the first surface 210a of the substrate 210 is also covered by the first conductive layer 240. The first shielding layer 250 is disposed on the first conductive layer 240. The orthogonal projection of the first shielding layer 250 and the first ground layer 220 onto the first surface are at least partially overlapped with each other.

In one embodiment, the touch panel 300 further includes a second ground layer 222. The second ground layer 222 is disposed on the second surface 210b of the substrate 210 and covers a portion of the second surface 210b. The second surface 210b is opposite to the first surface 210a of the substrate 210.

In one embodiment, the touch panel 300 further includes a second passivation layer 232. The second passivation layer 232 is disposed on the second ground layer 222, and thereby the second ground layer 222 has a covered portion 222a and an exposed portion 222b. The covered portion 222a is covered by the second passivation layer 232.

In one embodiment, the touch panel 300 further includes a second conductive layer 242. The second conductive layer 242 is disposed on and covers the exposed portion 222b of the second ground layer 222 and a portion of the second passivation layer 232. Specifically, the exposed portion 222b of the second ground layer 222 may be completely covered or partially covered by the second conductive layer 242. A portion of the second surface 210b of the substrate 210 is also covered by the second conductive layer 242.

In one embodiment, the touch panel 300 further includes a second shielding layer 252. The second shielding layer 252 is disposed on the second conductive layer 242. The orthogonal projection of the second shielding layer 252 and the second ground layer 222 onto the second surface 210b are at least partially overlapped with each other. In other words, the second shielding layer 252 is at least partially overlapped with the second ground layer 222 in a direction D1 perpendicular to the second surface 210b.

In one embodiment, the first conductive layer 240 is a conductive adhesive layer. In one embodiment, the conductive adhesive layer includes a matrix part and a conductive part. The matrix part includes waterproof material. In one example, the waterproof material is a waterproof acrylic resin or an epoxy resin which can be cured by ultraviolet light treatment. The conductive part is dispersed in the matrix part. In one example, the conductive part is metal, such as silver. In one example, the conductive part is a conductive metal sphere coated with an insulating material.

In one embodiment, the first conductive layer 240 is an isotropic conductive adhesive layer. The isotropic conductive adhesive layer can generate vertical electrical conduction and lateral electrical conduction between the upper and lower metal layers when subjected to a relatively small pressing force and meanwhile preventing the structure of the final product from damages caused by a larger pressing force. The isotropic conductive adhesive layer can also reduce the manufacturing cost. In another embodiment, the first conductive layer 240 is an anisotropic conductive adhesive. The anisotropic conductive adhesive can generate vertical electrical conduction between the upper and lower metal layers without generating lateral electrical conduction.

In one embodiment, the second conductive layer 242 is made of the same material as the first conductive layer 240.

In summary, the various embodiments provided in the present invention may protect the ground layer of the touch panel from the influence of the external environment, such as erosion of moisture, in a shorter manufacturing process and a lower manufacturing cost.

The foregoing has outlined features of several embodiments so that those skilled in the art can better understand the detailed description that follows. Those skilled in the art should appreciate that they can readily use the present disclosure as a basis for designing or modifying other processes and structures for carrying out the same purposes and/or achieving the same advantages of the embodiments introduced herein. In view of the foregoing, it is intended that the present invention cover modifications and variations of this invention provided they fall within the scope of the following claims.

What is claimed is:

1. A touch panel, comprising:
a substrate having a first surface;
a first ground layer disposed on the first surface of the substrate;
a first passivation layer disposed on the first ground layer, thereby the first ground layer having a covered portion and an exposed portion;
a first conductive layer disposed on and covering the exposed portion of the first ground layer and a portion of the first passivation layer;
a second passivation layer disposed on the second ground layer, thereby the second ground layer having a covered portion and an exposed portion, wherein the covered portion is covered by the second passivation layer, and
a second conductive layer disposed on and covering the exposed portion of the second ground layer and a portion of the second passivation layer.

2. The touch panel of claim 1, further comprising a first shielding layer disposed on the first conductive layer.

3. The touch panel of claim 1, further comprising a second ground layer disposed on a second surface of the substrate and covering a portion of the second surface, wherein the second surface is opposite to the first surface of the substrate.

4. The touch panel of claim 1, further comprising a second shielding layer disposed on the second conductive layer, and an orthogonal projection of the second shielding layer and the second ground layer onto the second surface are at least partially overlapped with each other.

5. The touch panel of claim 1, wherein the first conductive layer is a conductive adhesive layer.

6. The touch panel of claim 5, wherein the conductive adhesive layer comprises a matrix part and a conductive part, the matrix part comprises an acrylic resin or an epoxy resin, while the conductive part is dispersed in the matrix part.

7. A method of manufacturing touch panel, comprising:
providing a laminate comprising a substrate, a first ground layer, a first passivation layer, a second ground layer, and a second passivation layer, wherein the substrate has a first surface and a second surface opposite to the first surface of the substrate, the first ground layer and the first passivation layer are sequentially disposed on the first surface of the substrate, the first ground layer has a covered portion and an exposed portion, the second ground layer and the second passivation layer are sequentially disposed on the second surface, a portion of the second surface is covered by the second ground layer having a covered portion and an exposed portion, and the covered portion is covered by the second passivation layer;
forming a first conductive layer covering on the exposed portion of the first ground layer and a portion of the first passivation layer;
forming a second conductive layer covering on the exposed portion of the second ground layer and a portion of the second passivation layer; and
forming a second shielding layer on the second conductive layer, wherein an orthogonal projection of the second shielding layer and the second ground layer onto the second surface are partially overlapped with each other.

8. The method of claim 7, further comprising forming a first shielding layer on the first conductive layer.

* * * * *